US008527677B1

(12) United States Patent
Richard et al.

(10) Patent No.: US 8,527,677 B1
(45) Date of Patent: Sep. 3, 2013

(54) SERIAL COMMUNICATIONS LINKS WITH BONDED FIRST-IN-FIRST-OUT BUFFER CIRCUITRY

(75) Inventors: Frederic Richard, Maidenhead (GB); Lambertus De Jong, Wantage (GB)

(73) Assignee: Altera Corporation, San Jose, CA (US)

( * ) Notice: Subject to any disclaimer, the term of this patent is extended or adjusted under 35 U.S.C. 154(b) by 126 days.

(21) Appl. No.: 12/823,959

(22) Filed: Jun. 25, 2010

(51) Int. Cl.
*G06F 3/00* (2006.01)

(52) U.S. Cl.
USPC .......... 710/54; 710/30; 710/52; 710/65; 710/68; 710/71; 710/106; 370/394; 370/477

(58) Field of Classification Search
None
See application file for complete search history.

(56) References Cited

U.S. PATENT DOCUMENTS

| | | | | |
|---|---|---|---|---|
| 5,515,371 A * | 5/1996 | Venters | ......................... | 370/517 |
| 5,970,067 A * | 10/1999 | Sathe et al. | .................... | 370/394 |
| 6,201,789 B1 | 3/2001 | Witkowski et al. | ........... | 370/230 |
| 6,490,296 B2 | 12/2002 | Shenoi et al. | ................. | 370/469 |
| 6,563,821 B1 * | 5/2003 | Hong et al. | .................... | 370/389 |
| 6,574,764 B2 | 6/2003 | Krech, Jr. et al. | ............. | 714/738 |
| 6,629,168 B1 * | 9/2003 | Kroll et al. | ....................... | 710/52 |
| 7,007,114 B1 * | 2/2006 | White et al. | ..................... | 710/52 |
| 7,007,115 B2 * | 2/2006 | Elboim et al. | .................. | 710/52 |
| 7,224,691 B1 * | 5/2007 | Yeluri et al. | ................... | 370/394 |
| 7,404,023 B1 * | 7/2008 | Kaszynski | .................... | 710/240 |
| 7,404,036 B2 * | 7/2008 | Hyde et al. | ..................... | 711/114 |
| 7,421,014 B2 * | 9/2008 | Kryzak et al. | ................. | 375/219 |
| 7,424,036 B1 * | 9/2008 | Alexander et al. | ............ | 370/474 |
| 7,529,984 B2 * | 5/2009 | Heise | ............................ | 714/701 |
| 7,535,844 B1 * | 5/2009 | Gulstone | ....................... | 370/236 |
| 7,724,742 B2 * | 5/2010 | Huotari et al. | ................ | 370/392 |
| 7,769,016 B1 * | 8/2010 | Yeluri et al. | .................. | 370/394 |
| 7,899,924 B2 * | 3/2011 | Oesterreicher et al. | ....... | 709/231 |
| 7,953,908 B2 * | 5/2011 | Ward | ............................. | 710/59 |
| 8,040,807 B2 * | 10/2011 | Pai et al. | ....................... | 370/236 |
| 8,165,257 B2 * | 4/2012 | Tripathi | ........................ | 375/372 |
| 8,190,796 B2 * | 5/2012 | Winchester et al. | ........... | 710/62 |
| 8,279,892 B2 * | 10/2012 | Denney et al. | ................ | 370/468 |
| 2002/0126712 A1 * | 9/2002 | Mueller | ........................ | 370/537 |
| 2003/0099261 A1 * | 5/2003 | Jacobsen et al. | ............. | 370/542 |
| 2004/0057539 A1 * | 3/2004 | Boles et al. | ................... | 375/354 |
| 2006/0095611 A1 * | 5/2006 | Winchester et al. | ........... | 710/52 |
| 2006/0129715 A1 * | 6/2006 | White et al. | .................... | 710/52 |
| 2006/0153285 A1 * | 7/2006 | Modlin | ......................... | 375/222 |
| 2006/0153308 A1 * | 7/2006 | Xu et al. | ....................... | 375/259 |
| 2006/0187911 A1 * | 8/2006 | Huotari et al. | ................ | 370/389 |
| 2008/0089342 A1 * | 4/2008 | Lansing et al. | ............... | 370/392 |
| 2010/0061234 A1 | 3/2010 | Pai et al. | .................... | 370/230.1 |

FOREIGN PATENT DOCUMENTS

EP           818941 A2 *  1/1998

OTHER PUBLICATIONS

"Speakeasy Bonded T1s" copyright Jul. 2009, speakeasy.net.*

(Continued)

*Primary Examiner* — Steven Snyder
(74) *Attorney, Agent, or Firm* — Treyz Law Group; David C. Kellogg

(57) ABSTRACT

Serial communications circuitry is provided that has bonded first-in-first-out (FIFO) buffer circuitry. The circuitry may include state machine and barrel shifter circuitry that conveys data between the bonded FIFO circuitry and a bonded serial communications path. The bonded FIFO circuitry and the bonded lane may increase the efficiency of the serial communications circuitry by reducing the number of empty data bytes buffered in the FIFO circuitry and conveyed over the serial communications path.

20 Claims, 11 Drawing Sheets

(56) References Cited

OTHER PUBLICATIONS

'Section V—Maintaining High-Speed LAN/WAN Systems' of 'High-Speed Cisco Networks: Planning, Design, and Implementation,' copyright 2002 by CRC Press LLC.*

'Wideband Data on T1 Carrier' by L.F. Travis et al., The Bell System Technical Journal, Oct. 1965.*

'T1 Networking Made Easy' from Pulse Technical Handbook Series, by Pulse, Inc., copyright 2004.*

'System-on-a-chip' article from Wikipedia.org, posted on May 22, 2008.*

Chan et al., U.S. Appl. No. 10/923,477, filed Aug. 20, 2004.

* cited by examiner

| NUMBER OF LANES | BITS/LANE | NUMBER OF MEMORY BLOCKS | MEMORY MODE | SPARE BITS |
|---|---|---|---|---|
| 1 | 256 | 8 | X36 | 24 |
| 2 | 128 | 8 | X36 | 9 |
| 4 | 64 | 8 | X36 | 2 |
| 8 | 32 | 16 | X36 | 35 |
| 16 | 16 | 16 | X18 | 16 |
| 32 | 8 | 16 | X9 | 7 |
| 1 | 256 | 8 | X40 | 56 |
| 2 | 128 | 8 | X40 | 25 |
| 4 | 64 | 8 | X40 | 10 |
| 8 | 32 | 8 | X40 | 3 |
| 16 | 16 | 8 | X20 | 0 |
| 32 | 8 | 16 | X10 | 9 |

FIG. 4

SERIAL COMMUNICATIONS LINKS WITH BONDED FIRST-IN-FIRST-OUT BUFFER CIRCUITRY

BACKGROUND

This relates to serial communications links and, more particularly, to serial communications links with bonded first-in-first-out buffer circuitry.

Serial communications are often used in modern electronics systems. Serial communications can be faster than parallel communications, use fewer pins, and, particularly when differential signaling schemes are used, can have higher noise immunity.

It can be challenging to handle serial data streams at high data rates (e.g., at data rates above several Gbps). As a result, it is often advantageous to support high-speed serial data communications using multiple smaller serial data paths operating in parallel. These smaller serial data paths are often referred to as "lanes."

The efficiency of communications circuitry is often measured by how efficiently the circuitry performs in worst-case scenarios. For example, the efficiency of communications circuitry having a 256 bit bus is often measured when the circuitry is conveying 65 bytes packets. One measure of the efficiency of the communications circuitry is how many data bytes conveyed over the bus are empty. Another measure of the efficiency of the communications circuitry is how many data bytes stored in buffer circuitry are empty. Unbonded lanes and unbonded buffer circuitry are commonly used in conventional serial communications circuitry, but are inefficient in these types of worst-case scenarios. These inefficiencies increase the cost of the communications circuitry by requiring additional memory capacity in buffer circuitry and increased bus frequencies to achieve high data rates.

It would therefore be desirable to be able to provide communications circuitry with enhanced efficiencies.

SUMMARY

Serial communications circuitry for integrated circuits is provided. The serial communications circuitry may include bonded first-in-first-out (FIFO) buffer circuitry, bonded lanes, and state machine and barrel shifter circuitry.

An integrated circuit may use serial communications circuitry to communicate with another integrated circuit and may use the serial communications circuitry for internal communications. If desired, each integrated circuit may include output circuitry and may include input circuitry. These arrangements can provide bidirectional communications between two integrated circuits, bidirectional communications within a single integrated circuit, unidirectional communications between two integrated circuits, and unidirectional communications within a single integrated circuit (as examples).

State machine and barrel shifter circuitry may be used to shift and combine data from multiple FIFOs onto a bonded lane when transmitting data and may be used to shift and split data from the bonded lane to multiple FIFOs when receiving data. By combining and splitting data in these ways, the state machine and barrel shifter circuitry can reduce the number of empty bytes between data packets (e.g., the number of empty bytes transmitted over the bonded lane and buffered in the bonded FIFOs may be reduced).

As one example, a bonded lane may have a communications width of 32 bytes (256 bits) (e.g., the bonded lane may carry 32 bytes in each clock cycle). (The communications width may sometimes be referred to as a datapath width or a bus width.) When conveying data packets that are a multiple of the communications width of the bonded lane (e.g., 32 byte data packets, 64 byte data packets, 96 byte data packets, etc.), the full capacity of the bonded lane is utilized. Under so-called worse-case scenarios, the bonded lane conveys data packets that are one-byte larger than a multiple of the communications width of the bonded lane. Unlike conventional arrangements in which the extra byte would consume the full width (e.g., 32 bytes) of a clock cycle, the state machine and barrel shifter circuitry can combine the beginning of a subsequent data packet with the final byte (or bytes) of the current data packet to fill out as much of the full width as possible, thereby maximizing the efficiency of the bonded lane and bonded FIFO circuitry.

Further features of the invention, its nature and various advantages will be more apparent from the accompanying drawings and the following detailed description of the preferred embodiments.

BRIEF DESCRIPTION OF THE DRAWINGS

FIG. 4 is a table showing how many spare bits are available for additional information for various memory sizes and various numbers of lanes in a communications link in accordance with an embodiment of the present invention.

DETAILED DESCRIPTION OF THE PREFERRED EMBODIMENTS

This relates to serial communications links and, more particularly, to serial communications links with bonded first-in-first-out buffer circuitry. The invention also relates to serial communications links with bonded lanes.

Serial communications may involve a single path (i.e., a single differential pair of signal wires over which data is conveyed in series) or may involve multiple parallel serial paths (called lanes). In a multi-lane arrangement, a relatively higher-rate serial link is formed from multiple parallel relatively lower-rate serial paths. For example, four lanes operating at about 10 Gbps may be used in parallel to support the functions of a 40 Gbps Gigabit Ethernet serial link. This is merely one illustrative configuration. The data streams from any number of lower-rate serial channels may be combined to form a higher-rate serial link.

Figure 1:
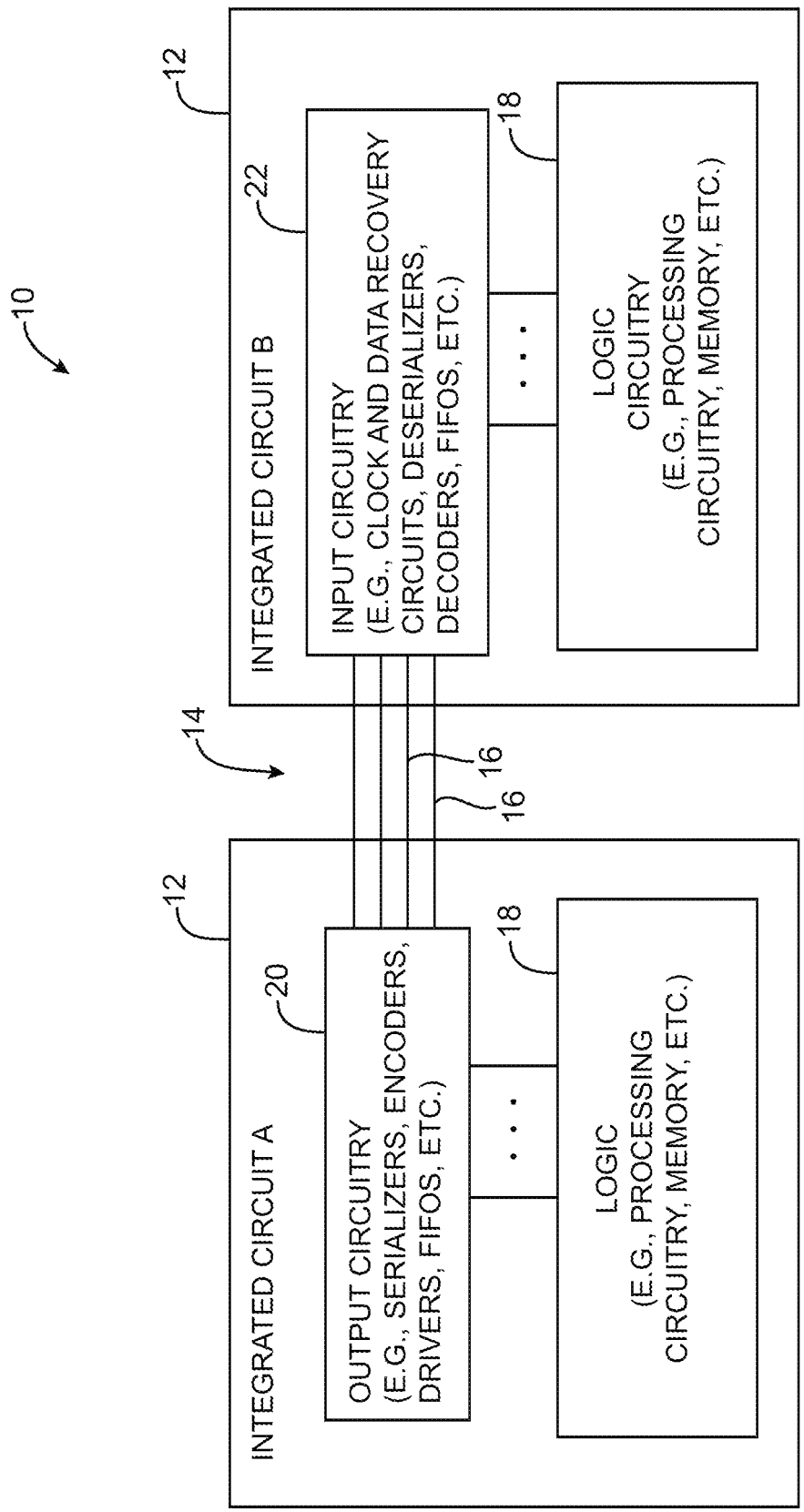
FIG. 1 is a schematic diagram of an illustrative pair of integrated circuits that can communicate over a communications link using bonded first-in-first-out buffer circuitry in accordance with the present invention.

Illustrative equipment 10 having two integrated circuits 12 that communicate over a serial communications link 14 is shown in FIG. 1. Integrated circuits 12 may be used in any suitable electronics equipment. For example, each integrated circuit 12 may be mounted on a different line card connected to a common system backplane in rack-mounted data processing or telecommunications equipment. As another example, integrated circuits 12 may be mounted on the same card or may be used in other types of electronic equipment. Each integrated circuit 12 may be, for example, a programmable integrated circuit, a microprocessor, a digital signal processor, an application-specific integrated circuit (ASIC), etc.

Serial link 14 is generally a high-speed link having a data rate of many Gbps, although slower serial links may be used if desired. Link 14 may be made up of a single serial link 16 or, if desired, may be made up of a number of slower parallel serial links (lanes) 16. Each lane 16 may, for example, be formed from a differential signal path having a pair of conductors that support communications at a serial data rate of multiple Gbps. The use of multi-lane serial links such as the illustrative four-lane link 14 of FIG. 1 to support communications between chips in an electrical system helps to overcome some of the difficulties associated with handling single-link serial data streams at extremely high data rates (e.g., 10 Gbps, 40 Gbps, 100 Gbps, or greater than 100 Gbps), because the lanes 16 have lower data rates than would be required if all of their serial data were passed through a single pair of differential signal conductors.

In general, integrated circuits such as circuits 12 of FIG. 1 may have only transmitting circuitry, may have only receiving circuitry, or may have both transmitting and receiving circuitry. In the example of FIG. 1, integrated circuit A has logic circuitry 18 that generates data. Output circuitry 20 may be used to buffer the data from logic circuitry 18 and to serialize the data in each data stream (e.g., in each lane 16). Drivers in output circuitry 20 may be used to transmit the data from circuitry 18 to integrated circuit B over the multiple parallel lanes 16 of serial link 14.

At the receiving end of link 14, input circuitry 22 can be used to receive the transmitted data. The input circuitry 22 may include clock and data recovery circuits for extracting embedded clock signals and first-in-first-out (FIFO) buffer circuitry for buffering, deskewing, and synchronizing the incoming data on the parallel lanes 16. Input circuitry 22 may also include decoding circuitry for decoding data that was encoded in output circuitry 20 and deserializers for converting the serial data from lanes 16 to parallel data. The resulting data is provided to logic circuitry 18 on integrated circuit B.

Logic circuitry 18 may be any type of circuitry, including programmable logic, microprocessor circuitry, digital signal processor circuitry, processing circuitry that is part of an application-specific integrated circuit, memory circuitry, etc.

The FIFO circuitry in output circuitry 20 and in input circuitry 22 may include bonded FIFOs. With bonded FIFO arrangements, barrel shifter circuitry can be used to shift and combine data from one or two (or more) clock cycles to help reduce the number of empty bytes buffered by a FIFO circuit. In arrangements with bonded FIFOs in circuitry 20 and 22, the number of empty data bytes stored by the FIFOs during suboptimal conditions (such as when transmitting 65 byte packets over a 256 bit bus) is reduced relative to arrangements with unbonded FIFOs. Bonded FIFO arrangements may therefore allow the overall capacity and size of the FIFO circuitry to be reduced and/or may improve the performance of the FIFO circuitry. With bonded FIFO circuitry, the efficiency of FIFO circuitry 20 and 22 is increased relative to arrangements utilizing unbonded FIFO circuitry, thereby reducing the amount of memory capacity in FIFO circuitry 20 and 22 needed to achieve a certain performance level such as 100 Gbps.

If desired, the lanes 16 of link 14 may be bonded lanes. With bonded lane arrangements, barrel shifter circuitry can be used to shift and combine data to help reduce the number of empty bytes transmitted over a bonded lane. With bonded lanes, the number of empty data byes transmitted over a serial communications link during suboptimal conditions is reduced relative to arrangements with unbonded lanes. The efficiency of data transmissions over link 14 may be increased in arrangements with bonded lanes relative to arrangements with unbonded lanes, thereby allowing link 14 to operate at lower frequencies while maintaining a certain performance level such as 100 Gbps.

In general, barrel shifter circuitry can be used to shift and combine data from any number of clock cycles (e.g., one clock cycle, two clock cycles, three clock cycles, four clock cycles, etc.) to help reduce the number of empty bytes buffered by bonded FIFO and conveyed over bonded lanes. If desired, circuitry such as barrel shifter circuitry and state machine circuitry can shift and combine data from adjacent clock cycles (e.g., a first clock cycle and a second subsequent clock cycle).

Figure 2:
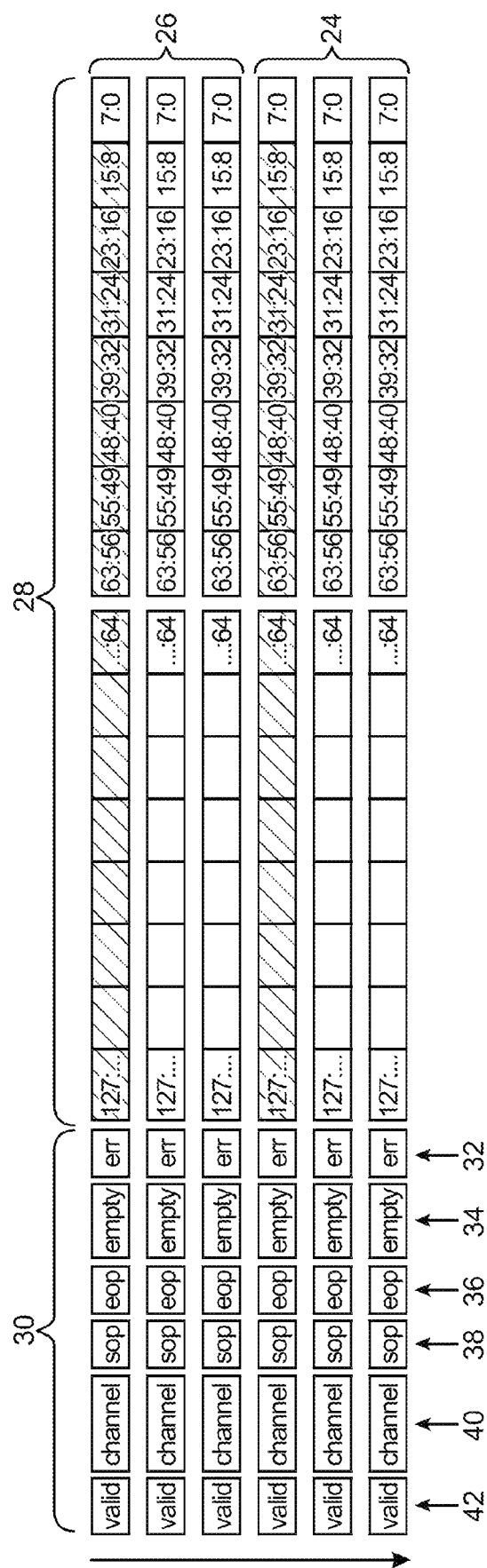
FIG. 2 is a diagram of a pair of data packets that are conveyed over a conventional unbonded communication link.

A pair of data packets in a conventional unbonded lane are shown in FIG. 2. Each row of data packets 24 and 26 represents a single clock cycle. As time passes, each row of the data packets shown in FIG. 2 is transmitted in turn through the communications link.

Each row of data packets 24 and 26 includes data 28 and control information 30. Control information 30 includes error symbols 32, number of empty bits symbols 34, end-of-packet symbols 36, start-of-packet symbols 38, channel number symbols 40, and validity symbols 42. Each error symbol 32 indicates whether an error is present in the row of data bits associated with that error symbol. Each end-of-packet symbol 36 indicates whether the row of data bits associated with that end-of-packet symbol is the last row of data bits in a data packet (such as one of data packets 24 or 26) and each number of empty bits symbol 34 includes a count of how many empty data bits are in that last row of data bits. Each channel number symbol 40 identifies which channel the data bits in the row of data bits associated with that channel number symbol are associated with. Each validity symbol 42 serves as a flag that indicates whether the row of control information 30 and data bits 38 associated with that validity symbol is valid.

The arrangement of FIG. 2 in which a single unbonded lane conveys data packets 24 and 26 is inefficient in certain situations. For example, in arrangements in which the last row of one of the data packets is mostly empty bits, the next data packet cannot begin until the next clock cycle. In these situations, the empty data packets reduce the effective bandwidth of the communications channel. As an example of this type of situation, which is sometimes referred to herein as a worst-case scenario, data bits 8 to 127 (e.g., the hatched data bits) in the last rows of data packets 24 and 26 are empty, thereby reducing the effective data rate of the communications channel.

Figure 3:
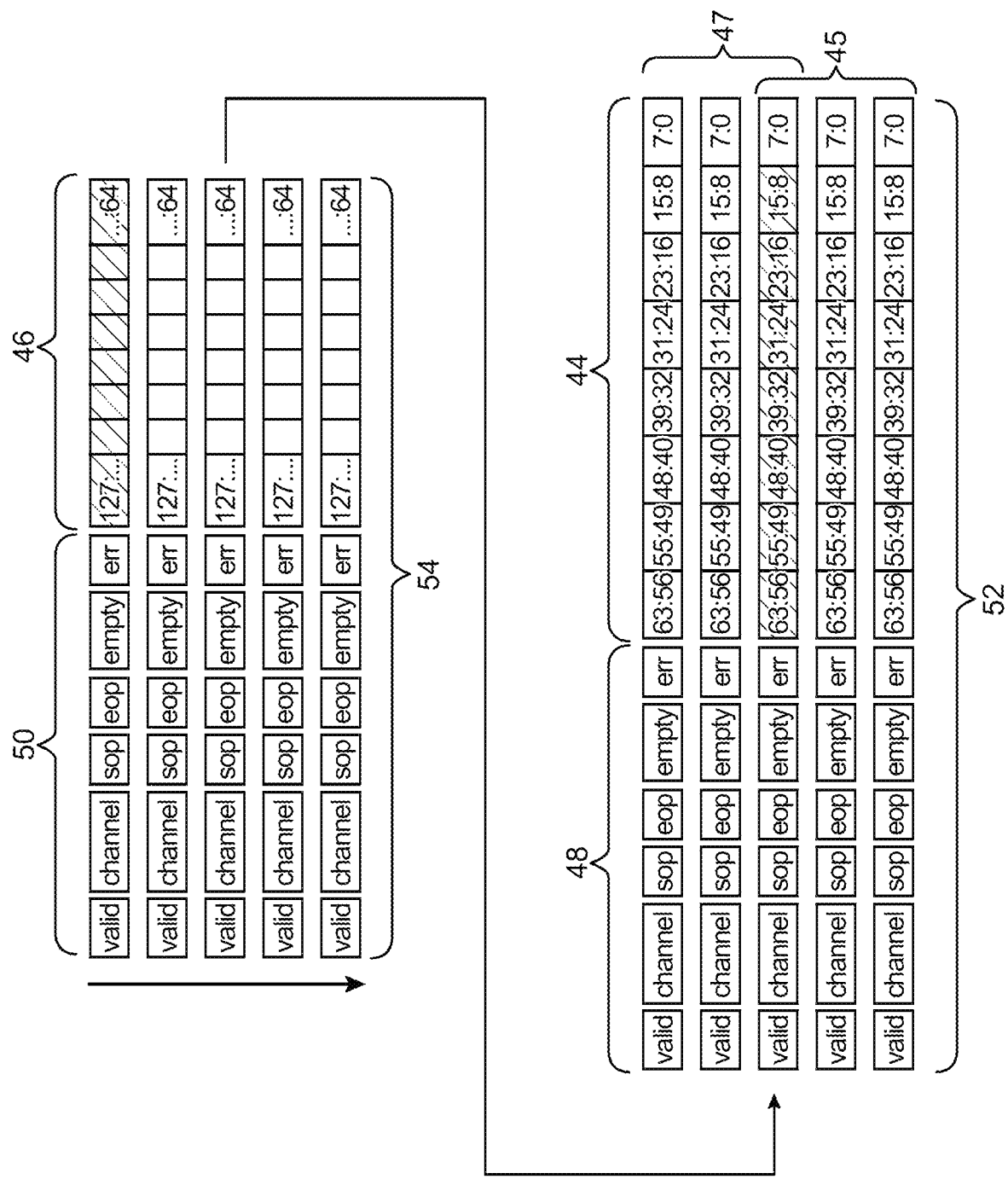
FIG. 3 is a diagram of an illustrative pair of data packets in a communications link having a pair of bonded lanes in accordance with an embodiment of the present invention.

An arrangement in which a communications link having two bonded lanes 52 and 54 conveys data such as data packets 45 and 47 of FIG. 2 is shown in FIG. 3. Each row of bonded lane 52 includes data 44 and control information 48 and each row of bonded lane 54 includes data 46 and control information 50.

As shown in FIG. 3, in the first two clock cycles (i.e., the bottom two rows), data from data packet 45 is spread over lanes 52 and 54. In the third clock cycle, lane 52 carries the end of data packet 45 and lane 54 carries the beginning of data packet 47. In the fourth and fifth clock cycles, lanes 52 and 54 carry the remaining portions of data from data packet 47. With the bonded lane arrangement of FIG. 3, the efficiency of the communications channel is increased. For example, the communications channel conveys two data packets (e.g., data packets 45 and 47) in five clock cycles (FIG. 3) instead of in six clock cycles as in the FIG. 2 example and reduces the number of empty data bits that are transmitted. In particular, the number of empty data bits (e.g., the hatched data bits) in the FIG. 3 example is reduced relative to the conventional arrangement of FIG. 2. In FIG. 3, As an example of a scenario which is sometimes referred to herein as a worst-case scenario, data bits 8 to 127 (e.g., the hatched data bits) in the last rows of data packets 24 and 26 of FIG. 2 are empty, thereby reducing the bandwidth of the communications channel. In contrast, in the FIG. 3 example, only bits 8 to 63 in the third clock cycle and bits 71 to 127 in the fifth clock cycle are empty (as shown by the hatch marks). The bonded arrangement of FIG. 3 therefore exhibits increased efficiency relative to the conventional unbonded arrangement of FIG. 2.

In general, each of the bonded lanes can include its own set of control information (e.g., control information 48 and 50). Control information 48 and 50 may include, as examples, error symbols (err), number of empty bits symbols (empty), end-of-packet symbols (eop), start-of-packet symbols (sop), channel number symbols (channel), and validity symbols (valid). Each error symbol (err) may indicate whether an error is present in the row of data bits associated with that error symbol. Each end-of-packet symbol (eop) may indicate whether the row of data bits associated with that end-of-packet symbol is the last row of data bits in a data packet (such as one of data packets 45 or 47) and each number of empty bits symbol (empty) may include a count of how many empty data bits are in that last row of data bits. Each channel number symbol (channel) may identify which channel the data bits in the row of data bits associated with that channel number symbol are associated with. Each validity symbol (valid) may serve as a flag that indicates whether the row of control information (48 or 50) and data bits (44 or 46) associated with that validity symbol is valid.

Increasing the number of bonded lanes in a communications channel such as link 14 of FIG. 1 may, in general, increase the bandwidth efficiency of the communications channel. The increase in efficiency is most pronounced in so called worst-case scenarios. For example, when 65 byte packets are conveyed over a 32 byte (256 bit) communications bus, the efficiency of the communications bus (i.e., the percentage of transmitted data bits that are not empty) may be approximately 68% with a single lane, 82% with two bonded lanes, 90% with four bonded lanes, 95% with eight bonded lanes, and 98% with sixteen bonded lanes.

Each bonded lane, however, typically needs its own control information. Therefore, increasing the number of bonded lanes beyond a certain point would not be beneficial as additional memory would be required. As an example, each lane may carry start of packet information (sop), end of packet information (eop), packet error information (err), and empty information (empty, i.e., a count of the total number of empty data bits in a current clock cycle for the corresponding lane) along with actual data. The empty information may be 3 bits of data for a 64 bit wide lane, 2 bits of data for a 32 bit wide lane, and 1 bit of data for a 16 bit wide lane, as examples. Because of this additional control information, the total amount of information (e.g., control information and data) may be 20 bits in a 16 bit wide data bus, 37 bits for a 32 bit wide data bus, and 70 bits for a 64 bit wide data bus.

In order to balance the benefits of having additional bonded lanes against the costs of the additional memory usage associated with the additional bonded lanes, it may be desirable to select an arrangement that includes the greatest number of lanes without increasing the amount of required memory (i.e., FIFO buffer circuitry). This is especially true in arrangements in which memory is available in preset sizes.

FIG. 4 is a table that shows how many spare bits of memory capacity are left in each memory block as a function of the number of bonded lanes in a communications path. As shown in FIG. 4, communications path 14 (FIG. 1) may include any desired number of lanes such as 1 lane, 2 bonded lanes, 4 bonded lanes, 8 bonded lanes, 16 bonded lanes, and 32 bonded lanes. In the example in which path 14 (or one of the paths 16) is 256 bits wide, the number of bits per lane is equal to 256 divided by the number of lanes, as shown in the second column of FIG. 4.

In arrangements in which each memory block (e.g., the memory blocks used in forming the FIFO buffers in circuitry 20 and 22 of FIG. 1) operates with a width that is a multiple of 9 (e.g., each memory block can operate in a 9 bit wide configuration, an 18 bit wide configuration, or a 36 bit wide configuration), the number of memory blocks needed to buffer data and control information from the bonded lanes of link 14 is shown in the second to seventh rows of the third column of FIG. 4. The second to seventh rows of the fourth column of FIG. 4 identify which mode (e.g., 9 bits wide, 18 bits wide, or 36 bits wide) the memory blocks that are used in forming FIFO buffers of circuitry 20 and 22 operate in. The second to seventh rows of the fifth column of FIG. 4 identify how many bits are unused (e.g., are not utilized by data or control information) in each example.

In arrangements in which each memory block operates with a width that is a multiple of 10 (e.g., each memory block can operate in a 10 bit wide configuration, a 20 bit wide configuration, or a 40 bit wide configuration), the number of memory blocks needed to buffer the data and control information of the bonded lanes of link 14 is shown in the eighth to thirteenth rows of the third column of FIG. 4. The eighth to thirteenth rows of the fourth column of FIG. 4 identify which mode (e.g., 10 bits wide, 20 bits wide, or 40 bits wide) the memory blocks operate in. The eighth to thirteenth rows of the fifth column of FIG. 4 identify how many bits are left unused (e.g., are not utilized by data or control information) in each example.

As it may be desirable to have the greatest number of lanes (thereby increasing efficiency of link 14) without requiring additional memories (thereby avoiding consuming excessive circuit area), it may be desirable to provide link 14 with four bonded lanes when utilizing memory available in a 36 bit width and to provide link 14 with sixteen bonded lanes when utilizing memory available in a 20 bit width (as these arrangements minimize the number of spare bits and maximize the number of lanes, without increasing the number of memory blocks). This is merely an example. The number of bonded lanes and number of memories utilized may be selected based the number of control bits associated with each bonded lane and the available widths of FIFO circuitry 20 and 22, along with other factors.

Figure 5:
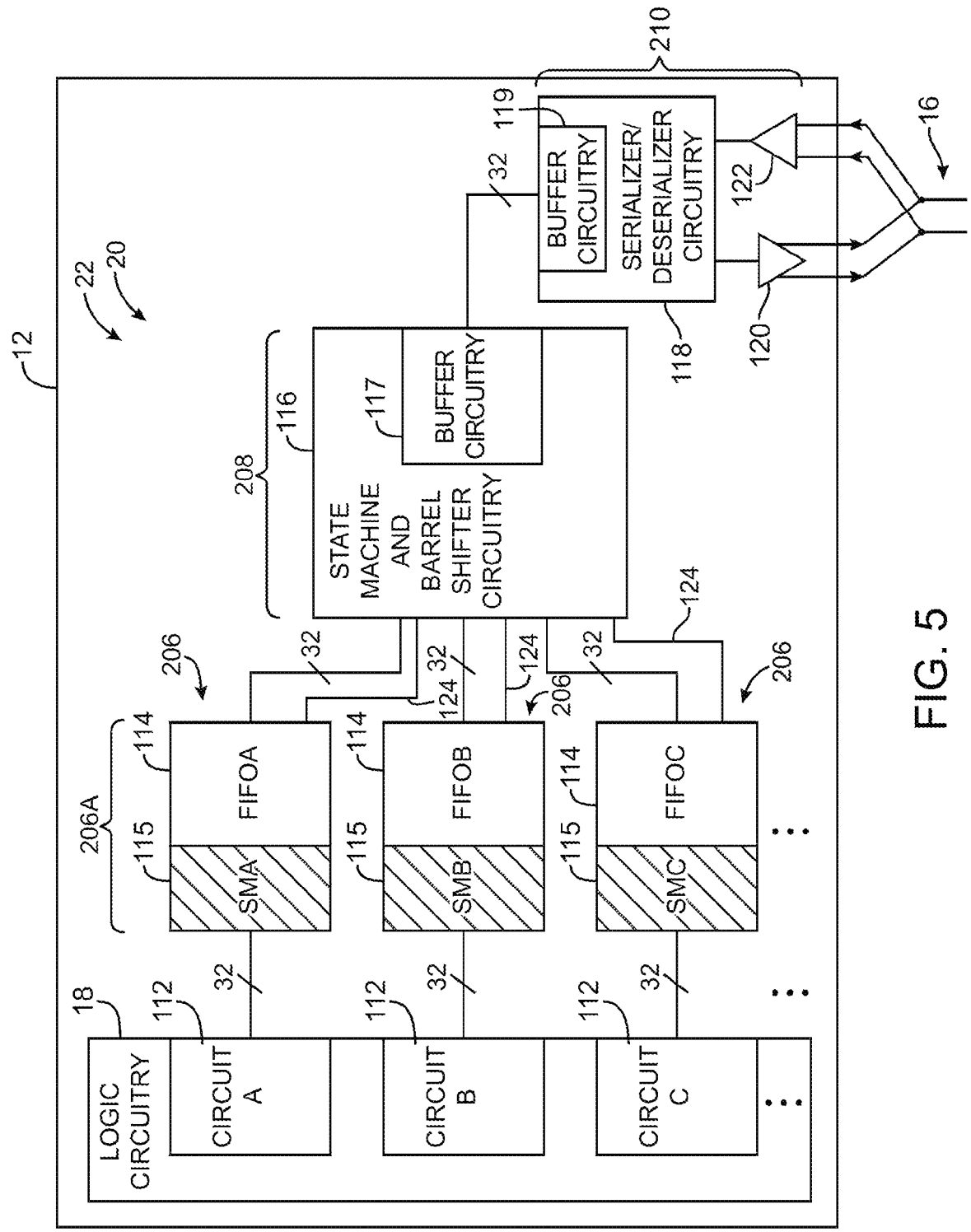
FIG. 5 is a schematic diagram of illustrative serial communications circuitry that may include bonded first-in-first-out buffer circuitry in accordance with an embodiment of the present invention.

An example of how integrated circuits 12 of FIG. 1 may be implemented is shown in FIG. 5. As shown in the example FIG. 5, input circuitry 20 and output circuitry 22 of integrated circuits 12 may include logic circuitry 18, FIFO buffer circuitry 114, state machine and barrel shifter circuitry 116, serializer/deserializer circuitry 118, and driver circuitry such as output driver 120 and input driver 122. In output circuitry 20, serializer/deserializer circuitry 118 may include serializer circuitry while omitting deserializer circuitry and may include output driver 120 while omitting input driver 122. Similarly, in input circuitry 22 serializer/deserializer circuitry 118 may include deserializer circuitry while omitting serializer circuitry and may include input driver 122 while omitting output driver 120. Combinations of output circuitry 20 and input circuitry 22, which may include serializer circuitry, deserializer circuitry, output driver 120, and input driver 22, are also possible. If desired, input circuitry 20 and output circuitry 22 may include other circuitry such as error checking circuitry, 8B/10B encoder circuitry, 8B/10B decoder circuitry, lane striping circuitry, lane bonding circuitry, clock compensation code generators, data encapsulation circuitry, link management circuits, idle code generators, data buffers, sync and deskew circuitry, control circuitry, etc.

Logic circuitry 18 may be segregated into multiple smaller circuits 112 (e.g., logic circuitry 18 may include circuits A, B, and C). Each of circuits 112 may produce and/or receive an independent stream of data through output circuitry 20 and input circuitry 22. The data stream associated with each circuit 112 may be conveyed between that circuit and a corresponding bonded FIFO circuit (e.g., one of FIFOA, FIFOB, or FIFOC) over a parallel data path, which has a 32 bit data width in the FIG. 5 example. In general, communications paths and busses such as the data paths in FIG. 5 may be any width. For example, the data stream associated with each circuit 112 may be conveyed between that circuit and a corresponding bonded FIFO circuit over a parallel data path having a data path width of 256 bits. The data paths between FIFO circuits 114, state machine and barrel shifter circuitry 116, serializer/deserializer circuitry 118 may, as examples, have data path widths of 256 bits.

Optional state machine circuitry 115 (e.g., state machine circuitry SMA, SMB, and SMC) may be used to load data into (when transmitting data) and out of (when receiving data) bonded FIFO circuits 114. State machine circuitry 115 may, if desired, include barrel shifter circuitry. In particular, state machine circuitry SMA, SMB, and SMC may shift and combine or shift and separate data packets to reduce the number of empty data bits buffered in bonded FIFO circuits 114. Each FIFO circuit 114 and state machine circuitry 115 may form a bonding/unbonding circuit such as circuit 206 that performs data bonding and data unbonding operations.

State machine and barrel shifter circuitry 116, which may include optional buffer circuitry 117, may convey data between bonded FIFO circuits 114 and serializer/deserializer circuitry 118 over a bonded communications lane circuit (shown as the 32 byte path between buffer circuitry 117 and 119 in FIG. 5). The bonded communications lane circuit shown in FIG. 5 may include serializer/deserializer circuitry 118 and one or more conductors connected to circuitry 118 such as a differential signal path having a pair of conductors that support serial data communications. Circuitry 116 may exchange control signals with FIFO circuits 114 over control paths 124. When the circuitry of FIG. 5 is used to transmit data, circuitry 116 may shift and combine data packets from bonded FIFO circuitry 114 to reduce the number of empty data bits that are transmitted. Circuitry 116 may then convey the data packets to circuitry 118. When the circuitry of FIG. 5 is used to receive data, circuitry 116 may shift and split data packets from circuitry 118 before forwarding the data packets to bonded FIFO circuitry 114. State machine and barrel shifter circuitry 116 and optional buffer circuitry 117 may form a bonding/unbonding circuit such as circuit 208 that performs data bonding and data unbonding operations.

Serializer/deserializer circuitry 118 may serialize outgoing data (in output circuitry 20) and may deserializer incoming data (in input circuitry 22). If desired, circuitry 118 may include buffer circuitry 119.

Output driver 120 may include differential driver circuitry that transmits serialized data from circuitry 118 to another circuit or another device over a differential signal path. Input driver 120 may include differential driver circuitry that receives serialized data from another circuit or another device over a differential signal path and conveys the serialized data to circuitry 118.

Serializer/deserializer circuitry 118, output driver 120, and input driver 122 may form input-output circuitry 210.

Illustrative data packets that may pass through communications circuitry such as the circuitry of FIG. 5 are shown in FIGS. 6, 7, 8, and 9.

Figure 6:
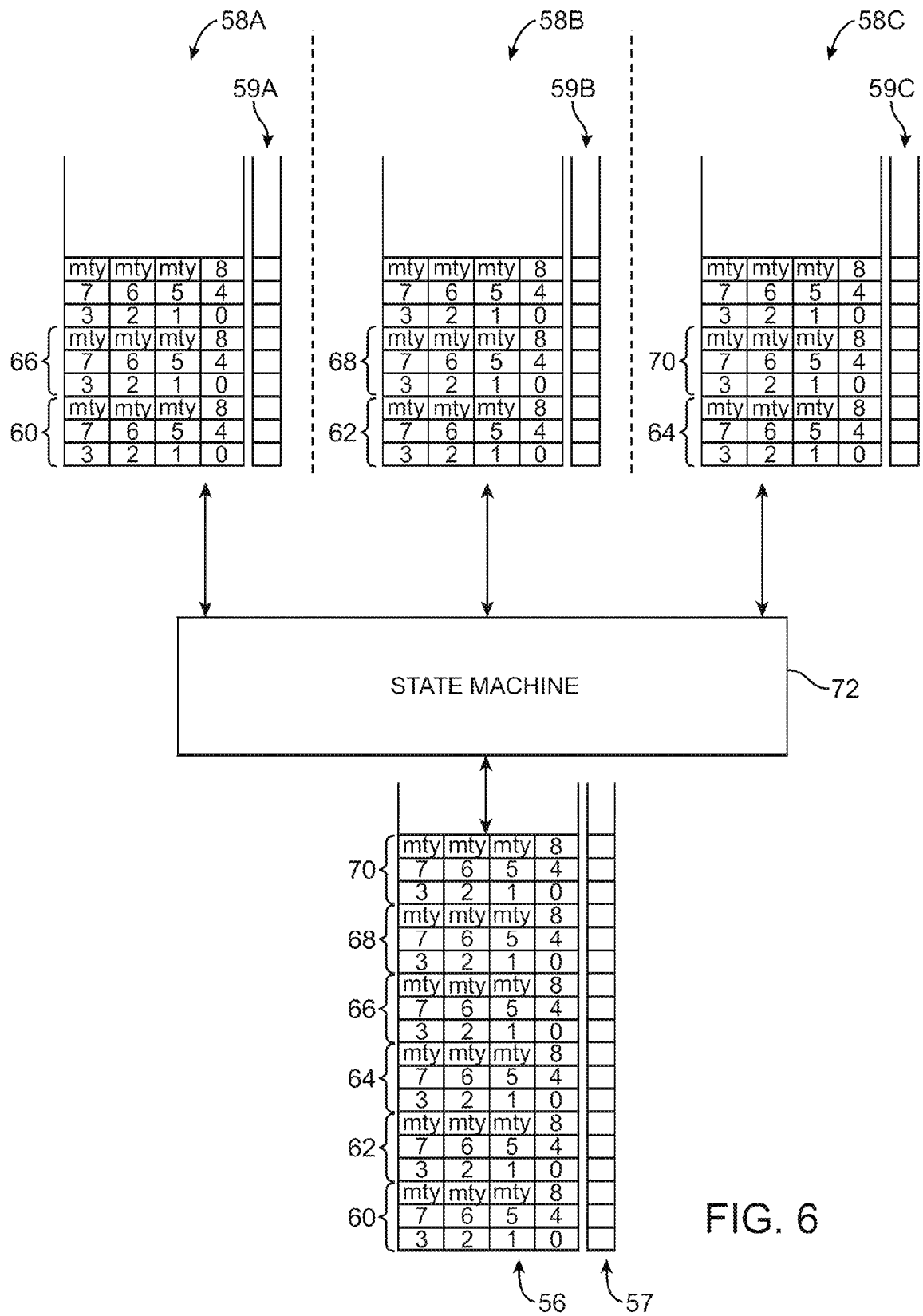
FIG. 6 is a diagram of illustrative data packets in a communications link having unbonded buffer circuitry and an unbonded communication bus in accordance with an embodiment of the present invention.

As shown in FIG. 6, serial communications circuitry such as output circuitry 20 and input circuitry 22 of FIG. 1 may include unbonded first-in-first-out (FIFO) buffer circuitry such as FIFO circuits 58A, 58B, and 58C (which may represent the data flowing through FIFO circuits 114 of FIG. 5) and may include unbonded lane 56 (which may correspond to the data stream passing through buffer circuitry 119 of FIG. 5). Each FIFO circuit 58A, 58B, and 58C may buffer data packets such as data packets 60, 62, 64, 66, 68, and 70 and may buffer control information associated with the data packets in control buffers 59A, 59B, and 59C. Unbonded lane 56 may convey data packets and control information in control buffer 57 between FIFO circuits 58A, 58B, and 58C and external circuitry (e.g., unbonded lane 56 may be one lane 16 of path 14 of FIG. 1).

Control information in buffers 59A, 59B, 59C, and 57 may include any suitable control data. As one example, the control information in buffers 59A, 59B, 59C, and 57 may include start of packet information, end of packet information, packet error information, and empty packet information.

Arrangements with unbonded FIFO circuits 58A, 58B, and 58C and unbonded lane 56 are inefficient in certain scenarios. FIG. 6 illustrates an example of a scenario in which unbonded FIFO circuits 58A, 58B, and 58C and unbonded lane 56 exhibit some inefficiencies.

In the example of FIG. 6, each of the squares (e.g., the numbered squares and the empty "mty" squares) may represent 8 bytes of data. Each square may represent an eighth byte location (i.e., position). In addition, each packet 60, 62, 64, 66, 68, and 70 in FIG. 6 may be a 65 byte packet that occupies 9 numbered squares with the ninth square having a single byte of data and seven empty bytes. This type of arrangement may be an example of a worst-case scenario in which 65 byte packets are transmitted over a 256 bit bus.

State machine circuitry 72 (which may correspond to circuitry 116 in FIG. 5) controls the flow of data and control information between FIFO circuits 58A, 58B, and 58C and lane 56. When the circuitry of FIG. 6 is used in transmitting data (e.g., when the circuit of FIG. 6 is used in implementing output circuitry 20 of FIG. 1), data packets such as packets 60, 62, 64, 66, 68, and 70 are loaded into FIFO circuits 58A, 58B, and 58C from logic circuitry 18 of FIG. 1. State machine 72 then conveys the data packets stored in the FIFO circuits to lane 56. When the circuitry of FIG. 6 is used in receiving data (e.g., when the circuitry of FIG. 6 is used in implementing input circuitry 22 of FIG. 1), data packets such as packets 60, 62, 64, 66, 68, and 70 are loaded into FIFO circuits 58A, 58B, and 58C from lane 56 by state machine 72. As an example, data packets 60, 62, 64, 66, 68, and 70 may be spread evenly over FIFO circuits 58A, 58B, and 58C and may also be transmitted and received over lane 56 in sequential order.

Each row of data illustrated in FIG. 6 represents a single clock cycle. State machine 72 moves entire rows between one of the FIFO circuits and lane 56, but is not capable (in this unbonded arrangement) of merging data from multiple rows or splitting data into multiple rows when empty data bytes are conveyed. Because of this limitation, there are multiple empty ("mty") bytes stored by unbonded FIFO circuits 58A, 58B, and 58C and conveyed by unbonded lane 56 (as shown in FIG. 6). Because FIFO circuits 58A, 58B, and 58C buffer these empty bytes, the efficiency of FIFO circuits 58A, 58B, and 58C is not ideal. In addition, because lane 56 conveys these empty bytes, the efficiency of lane 56 is not ideal. In order to maintain a given level of performance, the arrangement of FIG. 6 requires larger and/or more numerous FIFO buffer circuits and requires that lane 56 utilize higher frequencies compared to arrangements with bonded FIFO buffer circuits and bonded lanes to achieve similar performance levels.

Figure 7:
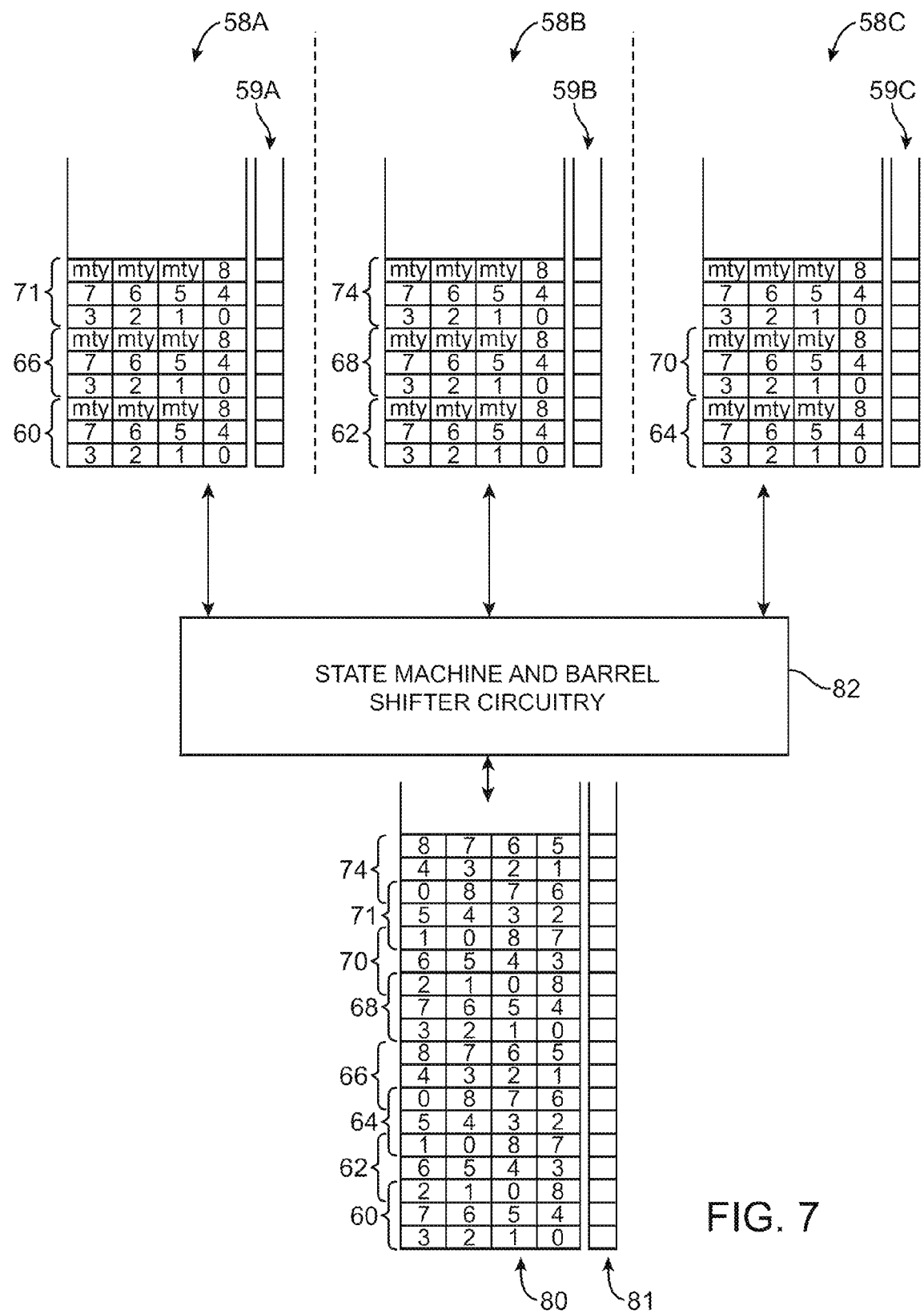
FIG. 7 is a diagram of illustrative data packets spread evenly across unbonded buffer circuitry in a communications link having unbonded buffer circuitry and a bonded communications bus in accordance with an embodiment of the present invention.

FIG. 7 illustrates an arrangement that includes a bonded lane such as bonded lane 80 (which may correspond to the data stream passing through buffer circuitry 119 of FIG. 5). If desired, the circuitry of FIG. 7 may be used in implementing serial communications circuitry such as output circuitry 20 and input circuitry 22 of FIG. 1. Bonded lane 80 may convey data packets and control information (in control buffer 81) between FIFO circuits 58A, 58B, and 58C and external circuitry (e.g., bonded lane 80 may be one lane 16 of path 14 of FIG. 1).

Control information in buffer 81 may include any suitable control information. As one example, the control information in buffer 81 includes start of packet information, end of packet information, packet error information, and empty packet information.

State machine and barrel shifter circuitry 82 may convey data and control information between unbonded FIFO circuits 58A, 58B, and 58C and bonded lane 80. When the circuitry of FIG. 7 is used in transmitting data, state machine and barrel shifter circuitry 82 conveys data packets such as data packets 60, 62, 64, 66, 68, and 70 from unbonded FIFO circuits 58A, 58B, and 58C to bonded lane 80 in a suitable order. When the circuitry of FIG. 7 is used in receiving data, state machine and barrel shifter circuitry 82 conveys data packets from bonded lane 80 to unbonded FIFO circuits 58A, 58B, and 58C.

As shown in FIG. 7, arrangements with bonded lanes such as bonded lane 80 can have increased efficiency (relative to unbonded arrangements such as the arrangement of FIG. 6). When transmitting data, circuitry 82 can combine portions of multiple data packets from multiple FIFO circuits to minimize (or eliminate) the number of empty "mty" data bytes transmitted over lane 80, thereby increasing the efficiency of lane 80. Circuitry 82 may reduce the number of empty bytes that are transmitted by appending a second data packet to a first data packet (e.g., circuitry 82 may append data packet 62 to the end of data packet 60).

As an example, in the first and second clock cycles shown in FIG. 7, circuitry 82 may convey bytes 0 through 7 of data packet 60 from FIFO buffer 58A to bonded lane 80. In the third clock cycle shown in FIG. 7, circuitry 82 conveys byte 8 of data packet 60 (which may include only a single bit of data in the 65 byte worst-case scenario) from buffer 58A and bytes 0 through 2 of data packet 62 from buffer 58B to bonded lane 80. As part of conveying bytes 0 through 2 of data packet 62 to bonded lane 80, circuitry 82 may buffer bytes 0 through 3 of data packet 62, shifting and forwarding bytes 0 through 2 to the appropriate location in lane 80 and storing byte 3 for use in the subsequent clock cycle.

As illustrated in the FIG. 7 example, data packets 60, 62, 64, 66, 68, 70, 71, and 74 are spread evenly over FIFO circuits 58A, 58B, and 58C and are transmitted and received over lane 80 in sequential order. An arrangement in which traffic (i.e., data packets) is conveyed unevenly is shown in FIG. 8.

Figure 8:
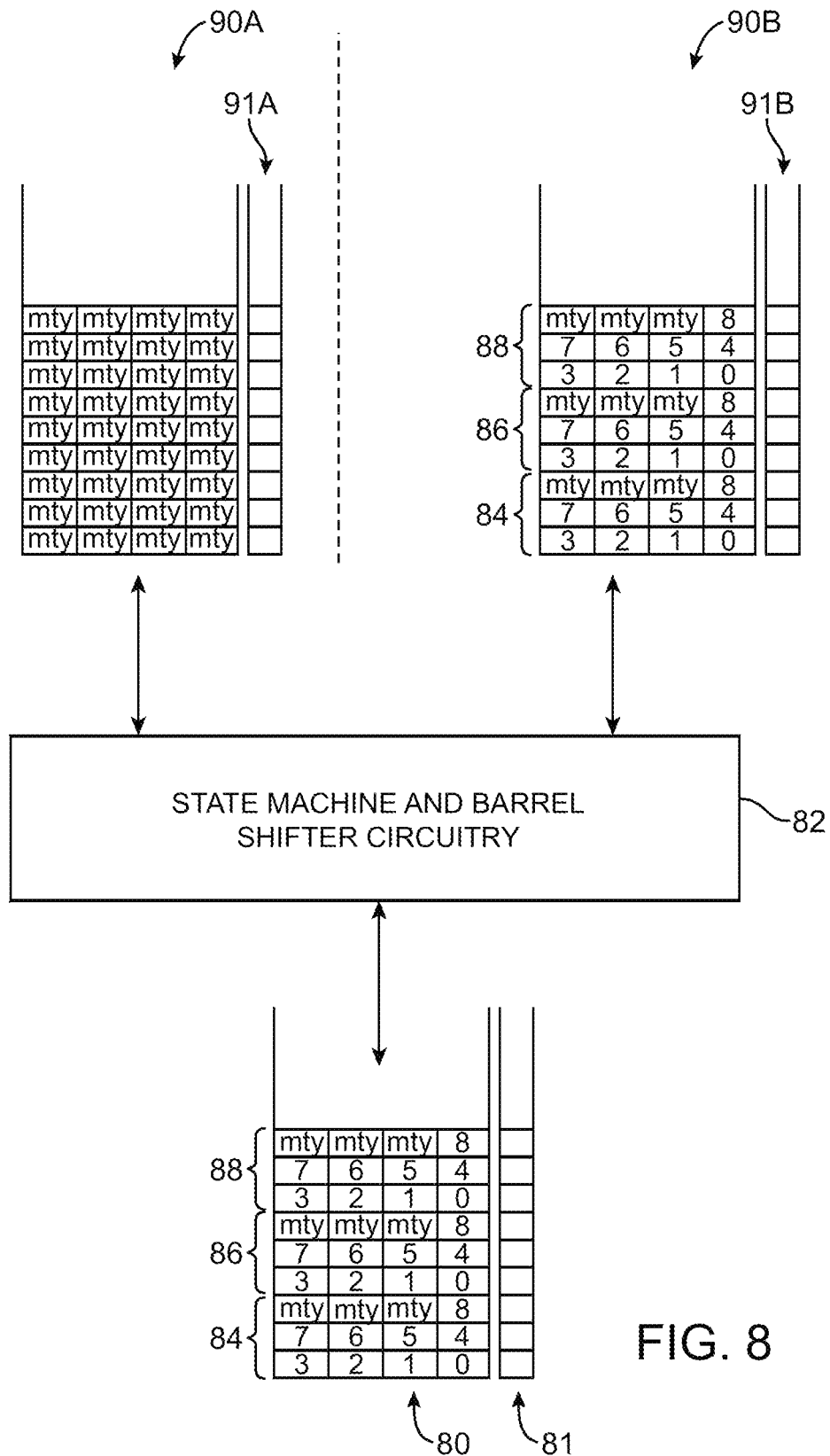
FIG. 8 is a diagram of illustrative data packets spread unevenly across unbonded buffer circuitry in a communications link having unbonded buffer circuitry and a bonded communications bus in accordance with an embodiment of the present invention.

In the example of FIG. 8, two unbonded FIFO circuits 90A and 90B (which may represent the data flowing through FIFO circuits 114 of FIG. 5) are coupled to bonded lane 80 through state machine circuitry 82. FIFO circuits 90A and 90B may buffer control information associated with the data packets in control buffers 91A and 91B. Data packets 84, 86, and 88 are conveyed unevenly between bonded lane 80 and unbonded FIFO circuits 90A and 90B. In particular, data packets 84, 86, and 88 are routed only through unbonded FIFO circuit 90B.

Because of the uneven distribution of data packet traffic between unbonded FIFO circuits 90A and 90B (in the FIG. 8 example), empty ("mty") bytes are buffered in unbonded FIFO 90B and conveyed over bonded lane 80. Because of these empty bytes, the efficiency of unbonded FIFO circuits 90A and 90B and bonded lane 80 is not ideal (in the example of FIG. 8). In particular, some of the bandwidth of bonded lane 80 is wasted on the conveyance of empty bytes and some of the storage capacity in FIFO circuits 90A and 90B is wasted on the buffering of empty bytes.

An arrangement with bonded FIFO circuits and a bonded lane can handle uneven traffic with increased efficiency relative to an arrangement with unbonded FIFO circuits (such as the FIG. 8 example). An example of this type of arrangement is shown in FIG. 9.

Bonded lane 96 (which may correspond to the data stream passing through buffer circuitry 119 of FIG. 5) may convey data packets and control information (in control buffer 98) between the FIFO circuits 92A and 92B (which may represent the data flowing through FIFO circuits 114 of FIG. 5) and external circuitry. Bonded lane 96 may be one lane 16 of path 14 of FIG. 1. FIFO circuits 92A and 92B may buffer control information associated with the data packets in control buffers 93A and 93B. State machine and barrel shifter circuitry 94 may convey data and control information between bonded FIFO circuits 92A and 92B and bonded lane 96. State machine and barrel shifter circuitry such as circuitry 94 may sometimes be referred to as control circuitry.

The control information in buffers 93A, 93B, and 98 may include any suitable control information. As one example, the control information in buffer 98 includes start of packet information, end of packet information, packet error information, and empty packet information.

Figure 9:
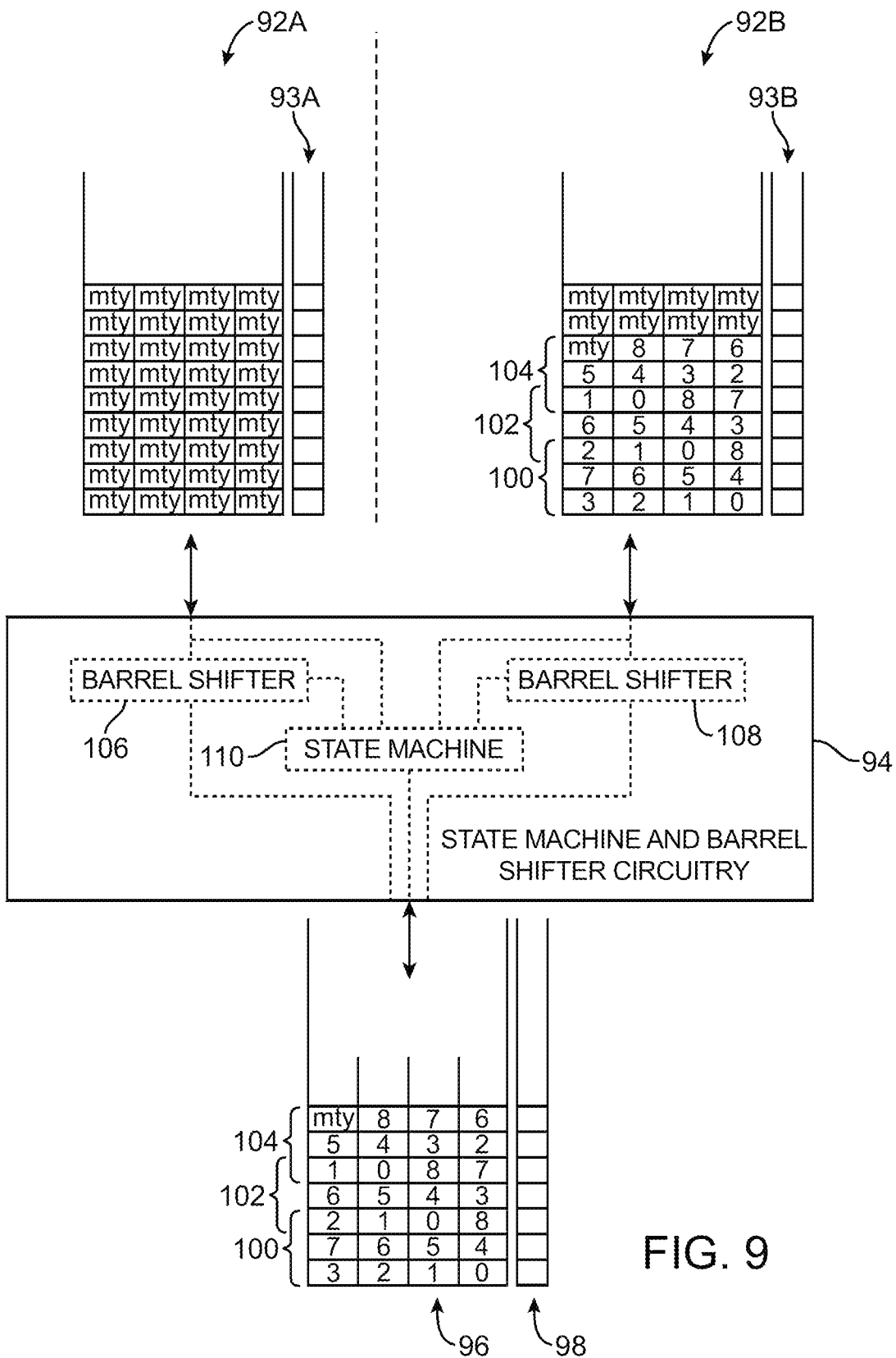
FIG. 9 is a diagram of illustrative data packets spread unevenly across bonded buffer circuitry in a communications link having bonded buffer circuitry and a bonded communications bus in accordance with an embodiment of the present invention.

When the circuitry of FIG. 9 is used in transmitting data, state machine and barrel shifter circuitry 94 conveys data packets such as data packets 100, 102, and 104 from bonded FIFO circuits 92A and 92B to bonded lane 80. When the circuitry of FIG. 9 is used in receiving data, state machine and barrel shifter circuitry 94 conveys data packets from bonded lane 96 to bonded FIFO circuits 92A and 92B. In the example of FIG. 9, data packets 100, 102, and 104 are unevenly distributed and are routed only through FIFO circuit 92B.

As shown in FIG. 9, arrangements with bonded lanes such as bonded lane 96 and bonded FIFO circuits such as FIFO circuits 92A and 92B have increased efficiency (relative to arrangements with unbonded circuitry) and are able to maintain their efficiency even when handling uneven traffic loads (i.e., traffic loads of the type shown in FIGS. 7 and 8).

With one suitable arrangement, state machine and barrel shifter circuitry 94 may include barrel shifters 106 and 108 and state machine circuitry 110. Barrel shifter 106 may convey data between FIFO 92A and lane 96 and barrel shifter 108 may convey data between FIFO 92B and lane 96. State machine 110 may control barrel shifters 106 and 108. In particular, state machine 110 may monitor data flowing through circuitry 94 and may provide control signals to barrel shifters 106 and 108. The control signals may determine how the bytes in each clock cycle are shifted, whether bytes from multiple FIFOs are combined, whether bytes from lane 96 are split into multiple FIFOs, and whether bytes are conveyed between lane 96 and a single FIFO.

When transmitting data, circuitry 94 can combine portions of multiple data packets from multiple FIFO circuits into a single clock cycle to minimize (or eliminate) the number of empty "mty" data packets transmitted over lane 96, thereby increasing the efficiency of lane 96. For example, in the first and second clock cycles shown in FIG. 9, circuitry 94 may convey bytes 0 through 7 of data packet 100 from bonded FIFO buffer 92B to bonded lane 96. In the third clock cycle shown in FIG. 9, circuitry 94 conveys byte 8 of data packet 100 from buffer 92B and bytes 0 through 2 of data packet 102 from buffer 92B to bonded lane 96.

Alternatively, when it is desired to transmit a data packet from FIFO buffer 92A after transmitting a data packet such as packet 100 from FIFO buffer 92B, circuitry 94 may combine the end of the packet from FIFO buffer 92B with the beginning of the packet from FIFO buffer 92A into a single clock cycle. In this type of arrangement, the beginning of the packet from buffer 92A may be shifted to fit in a single clock cycle with the end of the packet from buffer 92B and the additional bytes may be stored for use in a subsequent clock cycle.

When receiving data, circuitry 94 can split separate data packets that are carried in a single clock cycle and buffer the data packets on one or more FIFO circuits. If necessary, circuitry 94 can also shift portions of each data packet. For example, if it was desired to send data packet 102 to buffer 92A, bytes 0 through 2 of data packet 102 could be buffered in barrel shifter 106 and, in the next clock cycle, byte 3 of data packet could also be buffered in barrel shifter 106 and bytes 0 through 3 then clocked into FIFO buffer 92A.

Figure 10:
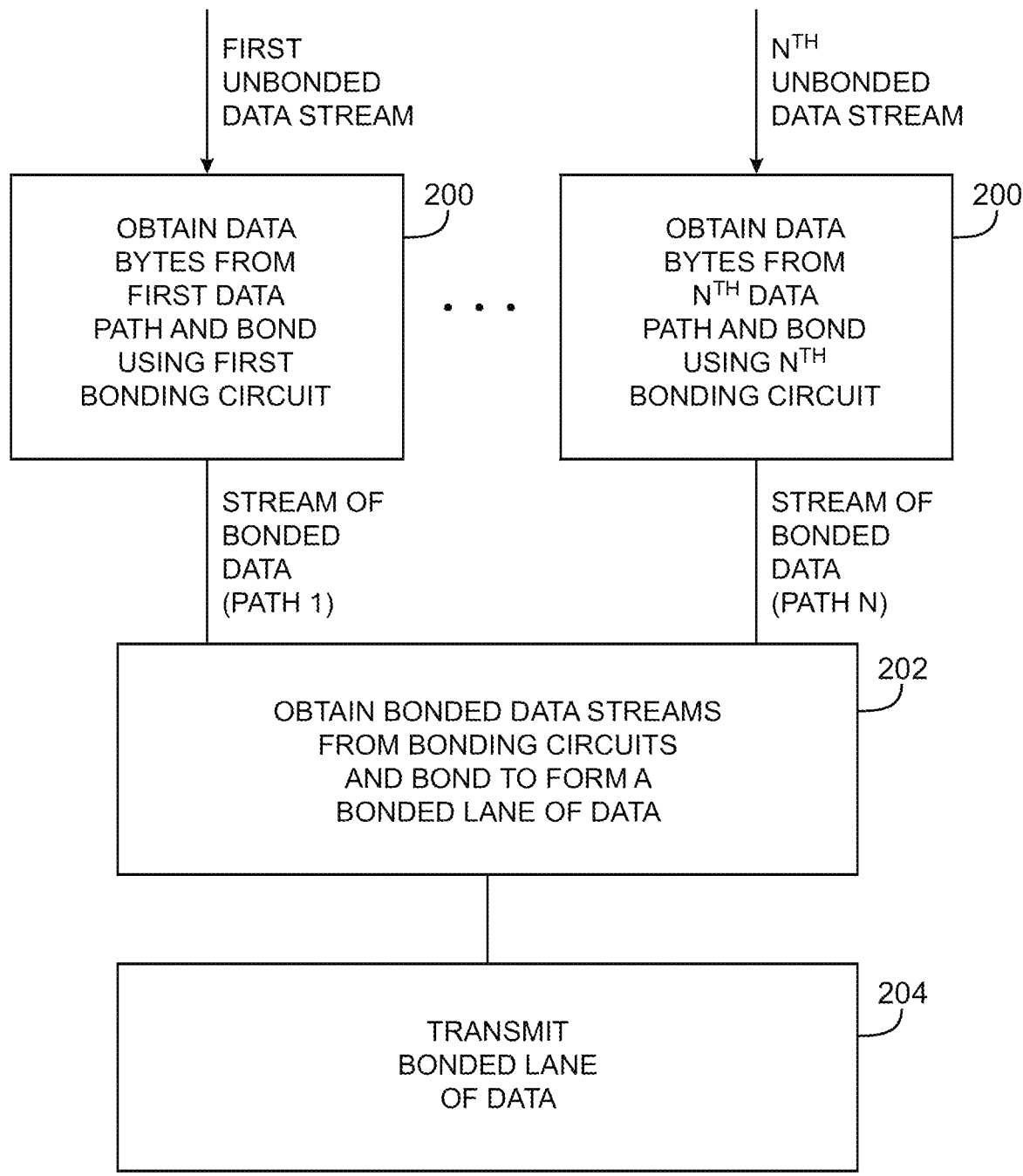
FIG. 10 is a flow chart of illustrative steps involved in using bonding circuits to transmit serial data over a lane in a communications link in accordance with an embodiment of the present invention.

FIG. 10 is a flow chart of illustrative steps involved in transmitting serial data over one of lanes 16 in communications link 14 using circuitry of the type shown in FIG. 5. During steps 200, each of the bonding circuits 206 obtains unbonded data from a respective data path. For example, bonding circuit 206A may obtain a stream of unbonded data from circuit A in circuitry 18. In each clock cycle of the unbonded data stream, some of the data byte positions may be occupied by data bytes (e.g., some of the data byte positions may be filled with non-empty data bytes) and some of the data byte positions may be empty (e.g., "mty"). The efficiency of the data stream in conveying data bytes therefore tends to vary from clock cycle to clock cycle. Maximum efficiency is obtained only when all byte positions are filled.

During the bonding operations of steps 200, the state machine circuitry and bonded FIFO circuitry of each bonding circuit 206 is used in replacing empty data bytes with available data bytes from nearby clock cycles. By improving the efficiency with which data bytes are packed together, the efficiency with which data is conveyed may be improved (i.e., each bonded data stream can convey data more efficiently and using fewer buffer resources per clock cycle than its corresponding unbonded stream).

At step 202, bonding circuit 208 may obtain the bonded data streams from each of the respective bonding circuits 206 and can produce a corresponding output data stream for transmission over lane 16. During the operations of bonding circuit 208, state machine and barrel shifter circuitry 116 and buffer circuitry 117 is used in packing the data bytes from the bonded data streams into an efficiently packed (bonded) output stream. In the bonded output stream, data (i.e., selected data packets) from the multiple streams supplied from circuits 206 is combined efficiently by removing appropriate empty data bytes.

At step 204, input-output circuitry 210 may be used to transmit the output data from bonding circuit 208 over lane 16 (e.g., using output driver 120).

Figure 11:
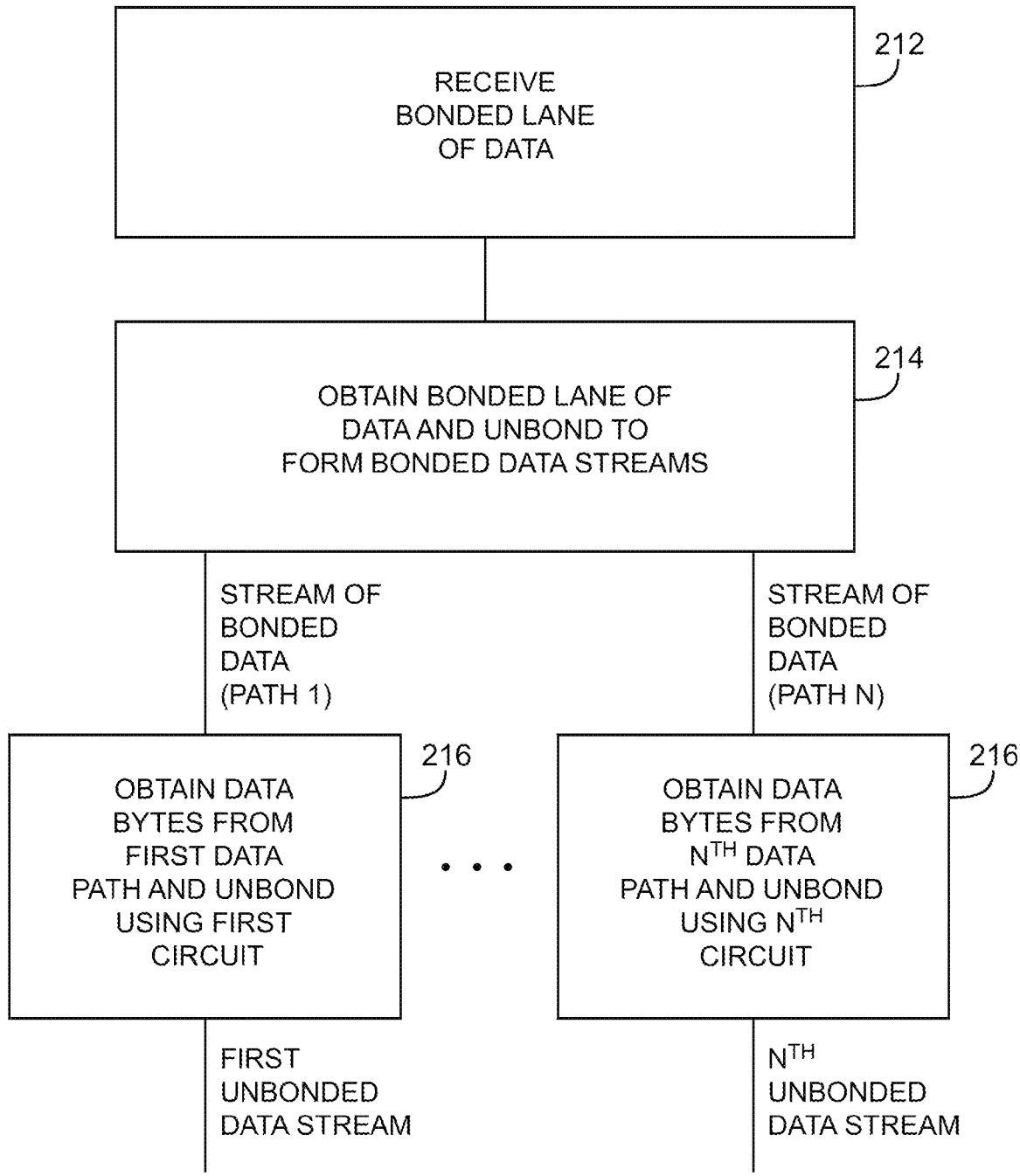
FIG. 11 is a flow chart of illustrative steps involved in using bonding circuits to receive serial data over a lane in a communications link in accordance with an embodiment of the present invention.

FIG. 11 is a flow chart of illustrative steps involved in receiving serial data over one of lanes 16 in communications link 14 using circuitry of the type shown in FIG. 5.

At step 212, input-output circuitry 210 may be used to receive input data over lane 16 (e.g., using input driver 122).

At step 214, unbonding circuit 208 (e.g., bonding circuitry 208 operating in reverse) may obtain the input data stream and unbond the input data stream to produce corresponding bonded data streams for each of the respective unbonding circuits 206. During the operations of unbonding circuit 208, state machine and barrel shifter circuitry 116 and buffer circuitry 117 is used in unpacking the input data stream into separate bonded data streams (which may include inserting empty data bytes into the bonded data streams).

During steps 216, each of the unbonding circuits 206 obtains bonded data from unbonding circuit 208. For example, bonding circuit 206A may obtain a stream of bonded data from state machine and barrel shifter circuitry 116. During the bonding operations of steps 216, the state machine circuitry and bonded FIFO circuitry of each bonding circuit 206 is used in inserting empty data bytes and shifting data bytes to unbond the bonded data stream associated with that bonding circuit 206.

The foregoing is merely illustrative of the principles of this invention and various modifications can be made by those skilled in the art without departing from the scope and spirit of the invention. The foregoing embodiments may be implemented individually or in any combination.

What is claimed is:

1. A method, comprising:
    with input-output circuitry, receiving an input data stream over a serial communications path that includes first and second streams of bonded data bytes;
    with a third circuit, separating the input data stream into the first and second streams of bonded data bytes;
    with a first circuit, producing a first stream of unbonded data bytes from the first stream of bonded data bytes; and
    with a second circuit, producing a second stream of unbonded data bytes from the second stream of bonded data bytes, wherein the serial communications path comprises a single lane of a multilane communications link, wherein receiving the input data stream comprises receiving the input data stream over the single lane, wherein each stream of bonded data bytes has at least one clock cycle in which at least one byte from a first packet and at least one byte from a second packet are conveyed, and wherein each clock cycle in each stream of unbonded data bytes conveys bytes from no more than one packet.

2. The method defined in claim 1 wherein the first circuit comprises a first first-in-first-out buffer circuit and a first state machine, wherein the second circuit comprises a second first-in-first-out buffer circuit and a second state machine, and wherein the third circuit comprises a third state machine.

3. The method defined in claim 1 wherein producing the first and second streams of bonded data bytes comprises forming the first stream of bonded data bytes with at least one data byte from a given clock cycle in the input data stream and forming the second stream of bonded data bytes with at least one data byte from the given clock cycle in the input data stream.

4. The method defined in claim 1 wherein producing the first stream of unbonded data bytes comprises inserting empty data bytes in the first stream of bonded data bytes.

5. The method defined in claim 1 wherein producing the first stream of unbonded data bytes comprises shifting a plurality of data bytes from a first clock cycle to an adjacent clock cycle.

6. A method for transmitting data bytes from an integrated circuit over a serial communications path that is coupled to the integrated circuit, comprising:
  with a first bonding circuit on the integrated circuit, producing a first stream of bonded data bytes from a first stream of unbonded data bytes;
  with a second bonding circuit on the integrated circuit, producing a second stream of bonded data bytes from a second stream of unbonded data bytes;
  with input-output circuitry on the integrated circuit, transmitting an output data stream that includes the first and second streams of bonded data bytes over the serial communications path, wherein the serial communications path comprises a single lane of a multilane communications link and wherein transmitting the output data stream comprises transmitting the output data stream over the single lane; and
  with a third bonding circuit on the integrated circuit, bonding the first and second streams of bonded data bytes into the output data stream, wherein each stream of bonded data bytes has at least one clock cycle in which at least one byte from a first packet and at least one byte from a second packet are conveyed, and wherein each clock cycle in each stream of unbonded data bytes conveys bytes from no more than one packet.

7. The method defined in claim 6 wherein producing the first stream of bonded data bytes comprises removing empty data bytes from the first stream of unbonded data bytes.

8. The method defined in claim 7 wherein removing the empty data bytes comprises replacing empty data bytes in a first clock cycle with non-empty bytes from a second clock cycle.

9. The method defined in claim 7 wherein removing the empty data bytes comprises replacing empty data bytes in a clock cycle with non-empty bytes from an adjacent clock cycle.

10. Communications circuitry on an integrated circuit that transmits data over a serial communications path that is coupled to the integrated circuit, comprising:
  a first bonding circuit on the integrated circuit that is configured to receive a first stream of unbonded data bytes and produce a corresponding first stream of bonded data bytes;
  a second bonding circuit on the integrated circuit that is configured to receive a second stream of unbonded data bytes and produce a corresponding second stream of bonded data bytes;
  input-output circuitry on the integrated circuit that transmits an output data stream that includes the first and second streams of bonded data bytes over the serial communications path, wherein the serial communications path comprises a single lane of a multilane communications link and wherein the input-output circuitry is operable to transmit the output data stream over the single lane; and
  a third bonding circuit that includes state machine and barrel shifter circuitry that bonds the first and second streams of bonded data bytes into the output data stream, wherein each stream of bonded data bytes has at least one clock cycle in which at least one byte from a first packet and at least one byte from a second packet are conveyed, and wherein each clock cycle in each stream of unbonded data bytes conveys bytes from no more than one packet.

11. The communications circuitry defined in claim 10 wherein the first bonding circuit comprises a first bonded first-in-first-out buffer and wherein the second bonding circuit comprises a second bonded first-in-first-out buffer.

12. The communications circuitry defined in claim 10 wherein the first bonding circuit comprises a first bonded first-in-first-out buffer and a first state machine circuit and wherein the second bonding circuitry comprises a second bonded first-in-first-out buffer and a second state machine circuit.

13. The communications circuitry defined in claim 10 wherein the state machine and barrel shifter circuitry that produces the output data stream produces the output data stream by shifting at least a first data byte in the first stream of bonded data bytes from a first clock cycle to a second clock cycle.

14. The communications circuitry defined in claim 10 wherein the first bonding circuit is configured to produce the corresponding first stream of bonded data bytes by removing empty data bytes from the first stream of unbonded data bytes.

15. The communications circuitry defined in claim 14 wherein the first bonding circuit is configured to remove the empty data bytes from the first stream of unbonded data bytes by replacing the empty data bytes in a first clock cycle with non-empty bytes from a second clock cycle.

16. The communications circuitry defined in claim 10 wherein the third bonding circuit is configured to bond the first and second streams of bonded data bytes into the output data stream by removing empty data bytes from at least one of the first and second streams of bonded data bytes, wherein the first bonding circuit is configured to produce the corresponding first stream of bonded data bytes by removing empty data bytes from the first stream of unbonded data bytes, and wherein the second bonding circuit is configured to produce the corresponding second stream of bonded data bytes by removing empty data bytes from the second stream of unbonded data bytes.

17. The method defined in claim 1 wherein separating the input data stream into the first and second streams of bonded data bytes comprises inserting empty data bytes into at least one of the first and second streams of bonded data byes.

18. The method defined in claim 17 wherein producing the first stream of unbonded data bytes comprises inserting empty data bytes in the first stream of bonded data bytes and wherein producing the second stream of unbonded data bytes comprises inserting empty data bytes in the second stream of bonded data bytes.

19. The method defined in claim 6 wherein bonding the first and second streams of bonded data bytes into the output data stream removing empty data bytes from at least one of the first and second streams of bonded data bytes.

20. The method defined in claim 19 wherein producing the first stream of bonded data bytes comprises removing empty data bytes from the first stream of unbonded data bytes and wherein producing the second stream of bonded data bytes comprises removing empty data bytes from the second stream of unbonded data bytes.

\* \* \* \* \*